United States Patent [19]
Fontana, Jr. et al.

[11] Patent Number: 6,131,271
[45] Date of Patent: Oct. 17, 2000

[54] METHOD OF PLANARIZING FIRST POLE PIECE LAYER OF WRITE HEAD BY LAPPING WITHOUT DELAMINATION OF FIRST POLE PIECE LAYER FROM WAFER SUBSTRATE

[75] Inventors: Robert Edward Fontana, Jr., San Jose; Hung-Chin Guthrie; William Leslie Guthrie, both of Saratoga; Eric James Lee, San Jose; Li-Chung Lee, Saratoga; Francisco Agustin Martin, Santa Clara, all of Calif.

[73] Assignee: International Business Machines Corporation, Armonk, N.Y.

[21] Appl. No.: 09/344,071

[22] Filed: Jun. 25, 1999

[51] Int. Cl.[7] ............................................ G11B 5/42
[52] U.S. Cl. .................................... 29/603.14; 29/603.15
[58] Field of Search ........................... 29/603.14, 603.13, 29/603.15, 603.16

[56] References Cited

U.S. PATENT DOCUMENTS

| | | | |
|---|---|---|---|
| 5,256,249 | 10/1993 | Hsie et al. | 156/656 |
| 5,363,265 | 11/1994 | Hsie et al. | 360/113 |
| 5,483,735 | 1/1996 | Postma et al. | 29/603 |
| 5,531,016 | 7/1996 | Postma et al. | 29/603 |
| 5,617,273 | 4/1997 | Carr et al. | 360/105 |
| 5,668,689 | 9/1997 | Schultz et al. | 360/113 |
| 5,715,597 | 2/1998 | Aylwin et al. | 29/603.08 |
| 5,722,157 | 3/1998 | Shouji et al. | 29/603.14 |
| 5,761,790 | 6/1998 | Carr et al. | 29/603.15 |
| 5,943,763 | 8/1999 | Shouji et al. | 29/603.14 |

*Primary Examiner*—Carl E. Hall
*Attorney, Agent, or Firm*—Gray Cary Ware & Freidenrich LLP; Ervin F. Johnston

[57] ABSTRACT

A method planarizes a first pole piece layer of a write head by lapping without delaminating the first pole piece layer from an underlying second read gap layer on a wafer substrate. This is accomplished by separating or dicing the first pole piece material layer in a field region about rows and columns of first pole piece layers of magnetic head assemblies so as to reduce the stress of the first pole piece material layer in the field. Accordingly, when the wafer substrate is lapped, such as by chemical mechanical polishing (CMP), a reduced stress prevents the first pole piece material layer from delaminating from the second read gap layer during the lapping operation.

21 Claims, 11 Drawing Sheets

METHOD OF PLANARIZING FIRST POLE PIECE LAYER OF WRITE HEAD BY LAPPING WITHOUT DELAMINATION OF FIRST POLE PIECE LAYER FROM WAFER SUBSTRATE

BACKGROUND OF THE INVENTION

1. Field of the Invention

The present invention relates to a method of planarizing a first pole piece layer of a write head by lapping without delamination of the first pole piece layer from the wafer substrate and, more particularly, to a step before lapping wherein intrinsic stress of a full film first pole piece material layer is relieved before lapping.

2. Description of the Related Art

A magnetic head assembly typically includes write and read heads wherein the write head writes magnetic bits of information into a rotating magnetic disk in a disk drive and the read head reads the magnetic bits of information from the rotating disk. The write head includes first and second pole piece layers which have a yoke region between a pole tip region and a back gap region. An insulation stack with a write coil layer embedded therein is located between the first and second pole piece layers in the yoke region, the first and second pole piece layers are separated by a nonmagnetic write gap layer at an air bearing surface (ABS) which faces the rotating disk and the first and second pole piece layers are magnetically connected in the back gap region.

The read head includes a spin valve sensor and first and second lead layers that are connected to first and second side edges of the spin valve sensor for conducting a sense current therethrough. The spin valve sensor and the first and second leads are located between nonmagnetic electrically conductive first and second read gap layers and the first and second read gap layers are, in turn, located between ferromagnetic first and second shield layers. In a merged magnetic head assembly the second shield layer and the first pole piece layer are a common layer whereas in a piggyback type magnetic head assembly these are separate layers which are separated by a nonmagnetic layer.

The initial steps in a typical method of making a read head is to form the first shield layer followed by sputter deposition of the first read gap layer on the first shield layer. Next, the read sensor and first and second hard bias and lead layers are formed with the first and second hard bias and lead layers connected to first and second side edges respectively of the sensor. After these steps, the first and second hard bias and lead layers have a profile which is higher than the top surface of the read sensor which, in cross section, has the configuration of a dip where the sensor is located. Next, the second read gap layer is sputter deposited on the sensor and on the first and second hard bias and lead layers resulting in the second read gap layer replicating the dip above the sensor. In a merged magnetic head a second shield/first pole piece layer is plated on the second read gap layer resulting in the second shield/first pole piece layer replicating the dip directly above the read sensor. In the construction of the write head the insulation stack is formed on the second shield/first pole piece layer in the yoke region and a write gap layer is formed on the second shield/first pole piece layer in a pole tip region. Next, the second pole piece layer is formed on the write gap layer, the insulation stack and is connected to the second shield/first pole piece layer in the back gap region.

Unfortunately, the write gap layer also replicates the dip directly above the read sensor which seriously degrades the performance of the write function of the write head. The dip in the write gap is referred to in the art as write gap curvature. When the write head writes magnetic bits of information into a rotating magnetic disk the bits are curved. When the read head, with its linearly extending sensor, reads the magnetic bits of information there is signal loss due to upwardly extending end portions of the magnetic bits of information which are not sensed by the read sensor. Accordingly, there is a strong-felt need to overcome the problem of write gap curvature.

It should be understood that multiple magnetic head assemblies arranged in rows and columns on a substrate for simultaneous construction. Accordingly, in constructing the second shield/first pole piece layer multiple second shield/first pole piece layers are constructed above respective sensors of rows and columns of read heads. Before plating a full film second shield/first pole piece material layer across the entire wafer a photoresist frame is formed masking the perimeters of the desired shape of the second shield/first pole piece layer for each magnetic head assembly. Accordingly, this perimeter defines where plating of the second shield/first pole piece layer will not occur during the plating step. Surrounding each perimeter will be a comparatively large field region where second shield/first pole piece material will be deposited. After forming the photoresist, which is referred to in the art as the resist frame, the second shield/first pole piece full film layer is plated on the wafer substrate. The resist frame is then removed leaving discrete second shield/first pole piece layers above each respective read sensor with the aforementioned second shield/first pole piece material layer portions in the field.

After plating the full film second shield/first pole piece layer on the wafer substrate the second shield/first pole piece material layer portions in the field are etched away leaving the discrete second shield/first pole piece layer for each magnetic head assembly. Next, the second read gap and the first read gap layers are etched away in the field leaving the first and second read gap layers directly below the second shield/first pole piece layer of each magnetic head assembly. This is followed by etching the first shield layer of each magnetic head assembly away in the field, leaving the first shield layer generally with a larger lateral expanse than the second shield/first pole piece layer.

In the construction of the write head a first insulation layer of the insulation stack is formed on the second shield/first pole piece layer in the yoke region. This layer is typically made of baked photoresist and extends across the width of the second shield/first pole piece layer and then laterally off of first and second side edges of the second shield/first pole piece layer in first and second laterally extending field regions beyond the first and second side edges. Accordingly, the first insulation layer has a high profile on top of the second shield/first pole piece layer and has depressed portions in the first and second laterally extending field regions. Unfortunately, when a pancake-shaped write coil is constructed on top of the first insulation layer of the insulation stack, it likewise has a high profile directly above the second shield/first pole piece layer and first and second depressed portions in the first and second field regions beyond the first and second side edges of the second shield/first pole piece layer. This results in a poorly formed write coil layer because of first and second steps at the first and second side edges of the second shield/first pole piece layer as it makes its transition from a high profile above the second shield/first pole piece layer into the first and second field regions. The write coil is typically copper (Cu) and is frame plated on the first insulation layer of the insulation stack. The photoresist layer that forms the resist frame has poor definition as it drops down from the high profile to the lower profiles in the first and second shield regions which can cause poorly shaped side walls of the write coil in the downwardly sloping regions and a thinning of the thickness of the turns of the write coil as these turns slope down from the high profile to the lower profile first and second shield regions.

As described hereinabove, the magnetic head assemblies are constructed in rows and columns on a wafer substrate. After completely forming the magnetic head assemblies on the substrate, the substrate is cut into rows of magnetic head assemblies whereupon each row is lapped to form an air bearing surface for each of the magnetic head assemblies. The row is then cut into individual magnetic head assemblies. This leaves each magnetic head assembly located on a cut portion of the wafer substrate which forms the aforementioned slider. Before the cutting operation at the wafer level the rows and columns of magnetic head assemblies are, in reality, rows and columns of slider sites upon which a magnetic head assembly is formed within each slider site. Each slider site at the surface of the wafer substrate is, in reality, a respective trailing edge of a slider after the cutting operations. The slider sites, which are typically rectangular on the surface of the wafer substrate, are immediately adjacent one another wherein each slider site has perimeter portions which are shared with at least two other immediately adjacent slider sites.

Accordingly, before removal of the first and second shield/first pole piece material layer portions, the second and first read gap portions and the first and second field portions of the first shield layer, photopatterned second shield/first pole piece layer within each slider site has a perimeter which is separated by the photoresist from field portions of the second shield/first pole piece material layer about the second shield/first pole piece layer. The field regions of the second shield/first pole piece material layer about each second shield/first pole piece layer is continuous. After photopatterning the second shield/first pole piece layers within each slider site the top of the wafer substrate appears as rows and columns of photopatterned second shield/first pole piece layers within a sea of second shield/first pole piece material in the fields of all of the slider sites. An understanding of this arrangement is important in understanding the present invention which is described under the summary of the invention.

SUMMARY OF THE INVENTION

We have investigated several schemes for overcoming write gap curvature and poorly defined write coils. In one scheme the magnetic head assemblies are formed in rows and columns of slider sites, as described hereinabove, including removal of second shield/first pole piece material, first and second read gap material and first shield layer material in the field regions. As stated hereinabove, this leaves each partially formed magnetic head assembly within each slider site surrounded by a depression in a field region. The depressed regions about each partially formed magnetic head assembly was then sputter deposited with a layer of alumina which has a thickness which is greater than the total thickness of the first shield layer, the first and second read gap layers and the second shield/first pole piece layer so that the top surface of the sputtered alumina layer is above the top surface of the second shield/first pole piece layer within each magnetic head assembly. The top surface of the alumina layer is then lapped until it forms a common flat surface with the top surface of the second shield/first pole piece layers of the magnetic head assemblies. As described hereinabove, the second shield/first pole piece layer of each magnetic head assembly has a dip directly above the read sensor. The lapping is continued until portions of the second shield/first pole piece layer on each side of the dip are removed so that the top surface of the alumina forms a common flat surface with the dipped portion of each second shield/first pole piece layer. In this manner, the top surface of each second shield/first pole piece layer of each magnetic head assembly forms a flat surface with the alumina layer in the field regions. The dip is no longer present. It should be noted that the alumina layer in the field regions provides support for portions of the write coil that extend laterally beyond the second shield/first pole piece layer within each slider site.

Accordingly, a highly defined write coil can be formed by frame plating. Further, the write gap can be formed without any write gap curvature because the top surface of each second shield/first pole piece layer is completely flat. Unfortunately, the alumina layer in the field poses a problem in locating alignment marks on the wafer substrate for subsequent processing, namely construction of the write coil layer. The top surface of the wafer substrate is provided with alignment marks which enable a photolithography tool to be sequentially moved over the top surface of the wafer substrate for light exposing the layer of photoresist employed for constructing the write coil. While the photolithograhy tool can see the alignment marks through the alumina layer, because of its transparency, this visual identification of the alignment marks is lost when a seed layer is sputter deposited on top of the alumina layer for the purpose of providing a return path of electrical current when the write coil is plated.

Unless other provision is made this scheme makes it difficult to employ the alignment marks during construction of the write coils and the second pole piece layers because of the obscurity of the alignment marks after the alumina layer is coated with a seed layer. It should be noted that in the process described in the related art hereinabove that a seed layer is also used for the construction of the write coil. In this method, however, the seed layer is directly on the alignment marks in the field regions, and is so thin that the seed layer replicates the alignment marks so that they can be identified by the photolithography tool.

A second scheme investigated includes the same process as described hereinabove under related art, except before removing the second shield/first pole piece material layer, the first and second read gap material layers and the first shield material layer in the field regions, the wafer substrate is lapped by chemical mechanical polishing (CMP) lapping. CMP employs a slurry that contains materials for grinding and chemically reacting with the material layers on the wafer. Before lapping, the second shield/first pole piece layers within the sea of second shield/first pole piece material surrounding them in the field was still in place. The wafer substrate was then lapped by CMP until the higher profiles of each second shield/first pole piece layer on each side of its dipped portion were lapped flat with the dipped portion. Unfortunately, the lapping caused the second shield/first pole piece material layer to delaminate from the underlaying second read gap layer. This delamination took the form of either a bubble within the second shield/first pole piece material layer or end portions of the second shield/first pole piece material layer peeling up from the second read gap layer. This process resulted in contaminating the CMP tool and reducing the manufacturing yield. Further, there was a slight rounding of the top surface of the second shield/first pole piece layers within each slider site which caused a slight write gap curvature.

We reasoned that the cause for delamination of the lapped second shield/first pole piece material layer across the wafer substrate was due to internal stresses within the second shield/first pole piece material layer surrounding the second shield/first pole piece layers within each slider site. It should be remembered that the second shield/first pole piece material layer is separated only by the photopatterned second shield/first pole piece layers at each slider site.

The present invention reduces the stress and obviates the delamination problem when the second shield/first pole piece material layer is lapped after photopatterning the second shield/first pole piece layers therein. We have relieved this stress by providing discontinuities or separations in the sea of second shield/first pole piece material layers in the field regions about the second shield/first pole piece layers at each slider site. The discontinuities are provided by providing a separation along the perimeter of each slider site. Accordingly, the sea of second shield/first pole piece material layer is not continuous across the perimeters as in the aforementioned scheme, but is now separated at these perimeters. This is accomplished during the photopatterning step in the formation of the second shield/first pole piece layers. Assuming that a positive photoresist layer is spun on the wafer substrate the photoresist layer is light exposed in all regions except the perimeters of the second shield/first pole piece layers and the perimeter of each slider site. When the photoresist is developed the exposed regions of the photoresist are removed leaving a photoresist pattern which covers the perimeters of the second shield/first pole piece layers and the perimeters of the slider sites with a predetermined width. Accordingly, when the second shield/first pole piece material layer is plated and the photoresist is removed, not only is the second shield/first pole piece layer formed with a separation at its perimeter, but each slider site is separated from all immediately adjacent slider sites along its perimeter. We have found that this major increase in discontinuities or separations in the second shield/first pole piece material layer on the wafer substrate reduces the stress of this layer so that when it is lapped by CMP no portion of the second shield/first pole piece layer delaminates from the underlying second read gap layer. Accordingly, this is a modification of the second scheme, described hereinabove, allowing the second shield/first pole piece layer within each slider site to be lapped by CMP to a flat surface so as to enable subsequent construction of a linearly extending write gap layer.

An object of the present invention is to provide a method of planarizing a first pole piece layer of a write head by lapping without delamination of the first pole piece layer from the wafer substrate.

Another object is to provide a method of planarizing second shield/first pole piece layers within rows and columns of slider sites without obscuring alignment marks on the wafer substrate with a minimum of process steps.

A further object is to relieve the stress of a full film second shield/first pole piece material layer on a wafer substrate before lapping by CMP so as to obviate delamination of the second shield/first pole piece material layer from the wafer substrate.

Other objects and advantages of the invention will become apparent upon reading the following description taken together with the accompanying drawings.

DESCRIPTION OF THE PREFERRED EMBODIMENTS

Figure 1:
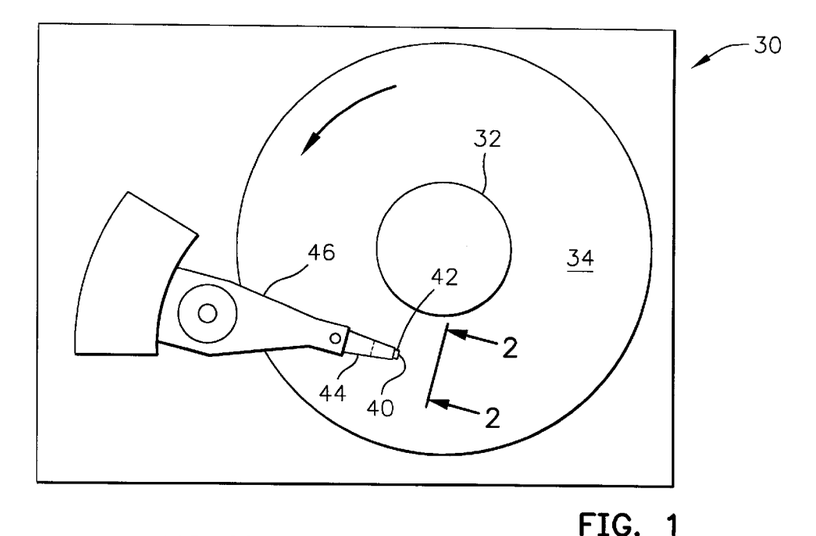
FIG. 1 is a plan view of an exemplary magnetic disk drive.
Figure 2:
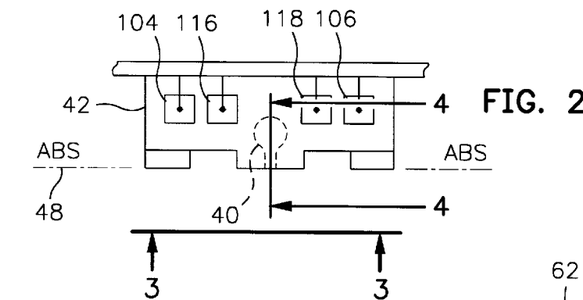
FIG. 2 is an end view of a slider with a magnetic head of the disk drive as seen in plane 2—2.

Referring now to the drawings wherein like reference numerals designate like or similar parts throughout the several views, FIG. 1 illustrates a magnetic disk drive 30. The drive 30 includes a spindle 32 that supports and rotates a magnetic disk 34. The spindle 32 is rotated by a motor (not shown) that is controlled by a motor controller (not shown). As shown in FIGS. 1 and 2 a combined read and write magnetic head 40 is mounted on a slider 42 that is supported by a suspension 44 and actuator arm 46. The suspension 44 and actuator arm 46 position the slider 42 so that the magnetic head 40 is in a transducing relationship with a surface of the magnetic disk 34. When the disk 34 is rotated by the motor the slider is supported on a thin (typically, 0.05, μm) cushion of air (air bearing) between the surface of the disk 34 and the air bearing surface (ABS) 48. The magnetic head 40 is employed for writing magnetic bits of information to multiple circular tracks on the surface of the disk 34, as well as for reading magnetic bits of information therefrom. Processing circuitry (not shown) exchanges signals, representing such information, with the head 40, provides motor drive signals for rotating the magnetic disk 34, and provides control signals for moving the slider to various tracks.

Figure 3:
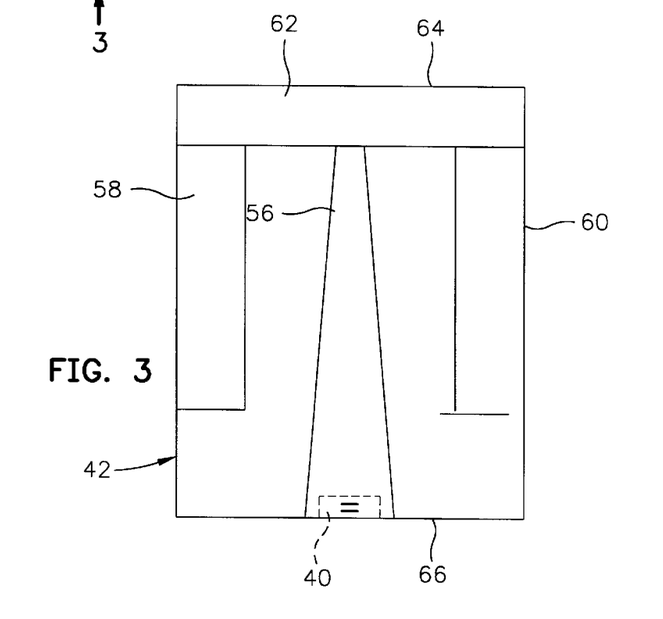
FIG. 3 is an ABS view of the slider taken along plane 3—3 of FIG. 2.

FIG. 3 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 4:
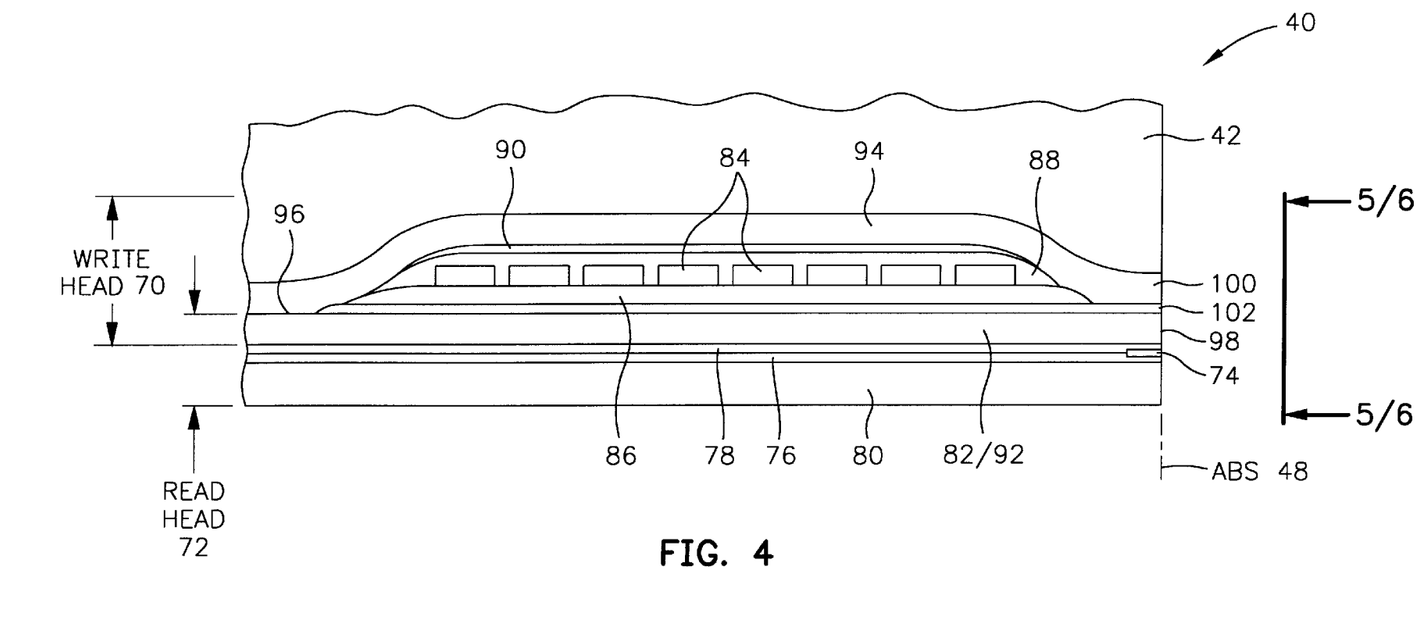
FIG. 4 is a partial view of the slider and a merged magnetic head as seen in plane 4—4 of FIG. 2.
Figure 5:
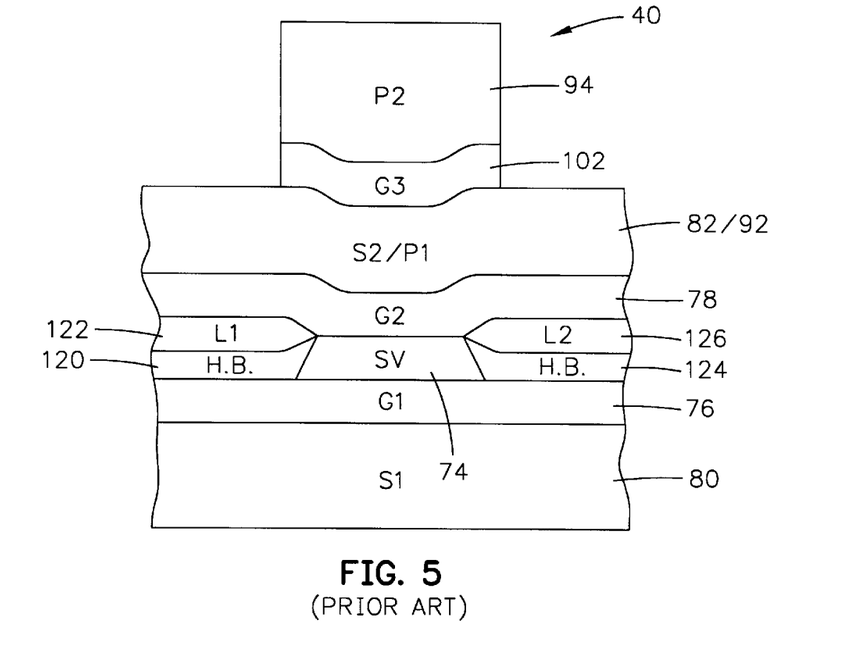
FIG. 5 is a partial ABS view of the slider taken along plane 5—5 of FIG. 4 to show the read and write elements of the magnetic head and the write gap with write gap curvature.

FIG. 4 is a side cross-sectional elevation view of the magnetic head 40, which includes a write head portion 70 and a read head portion 72, the read head portion having a spin valve sensor 74. FIG. 5 is an ABS view of FIG. 4. The spin valve sensor 74 is sandwiched between first and second gap layers 76 and 78, and the gap layers are sandwiched between first and second shield layers 80 and 82. In response to external magnetic fields, the resistance of the spin valve sensor 74 changes. A sense current Is conducted through the sensor causes these resistance changes to be manifested as potential changes which are processed as readback signals by the processing circuitry (not shown).

The write head portion of the magnetic head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. In a merged head the second shield 82 of the read head 72 also serves as a first pole piece 92 for the write head 70, as shown in FIG. 4. In a piggyback head these are separate layers.

FIG. 5 shows an ABS illustration of the magnetic head 40 wherein first and second hard bias (HB) and lead (L1) layers 120 and 122 are connected to a first side edge of the spin valve sensor 74 and second hard bias (HB) and lead layers (L2) 124 and 126 are connected to a second side edge of the spin valve sensor. Typically the thickness of the layers 120 and 122, as well as the thickness of the layers 124 and 126, is greater than the thickness of the spin valve sensor 74 resulting in a higher profile of these layers above the top surface of the spin valve sensor. Consequently, the second read gap layer 78, the second shield/first pole piece layer 82/92 and the write gap layer 102 dip down in a region above the top surface of the spin valve sensor 74. This causes the write gap 102 to have a curve resulting in what is known in the art as write gap curvature. This degrades the performance of the head since during the write function curved magnetic bits of information are written to a rotating disk and then the spin valve sensor 74 reads these curved magnetic bits of information straight across, thereby losing readback signal in first and second side portions of the read sensor.

Figure 6:
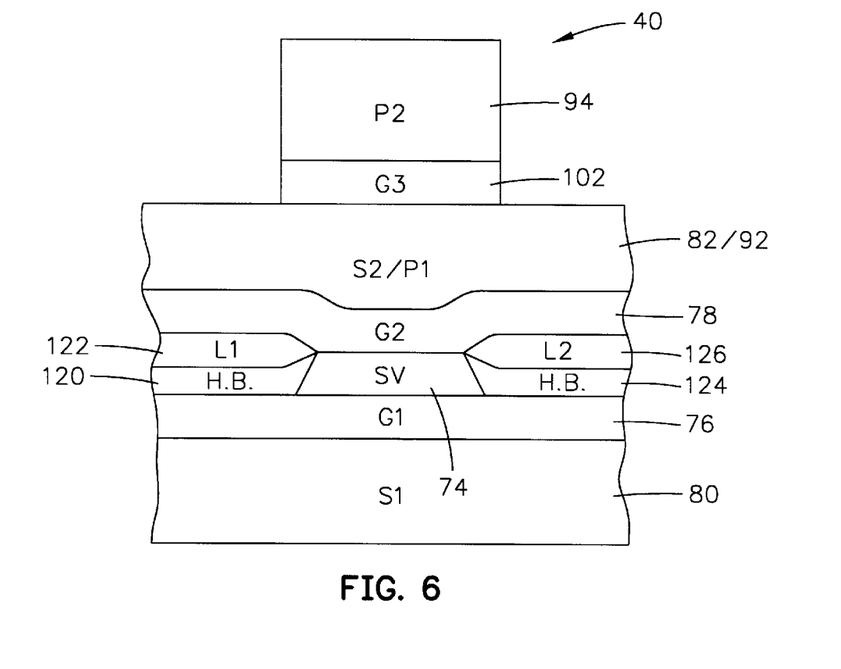
FIG. 6 is the same as FIG. 5 except the write gap does not have any write gap curvature.

FIG. 6 is an ABS illustration of the magnetic head 40 wherein the write gap layer 102 does not have any write gap curvature. This is because the top surface of the second shield/first pole piece layer 82/92 has been planarized prior to formation of the write gap layer 102. The present invention provides a method of making the magnetic head 40 wherein the write gap 102 does not have write gap curvature. The method overcomes problems associated with obscuring alignment marks on the wafer substrate and delaminating the second shield/first pole piece layer 82/92 from the second read gap layer 78.

Figure 7:
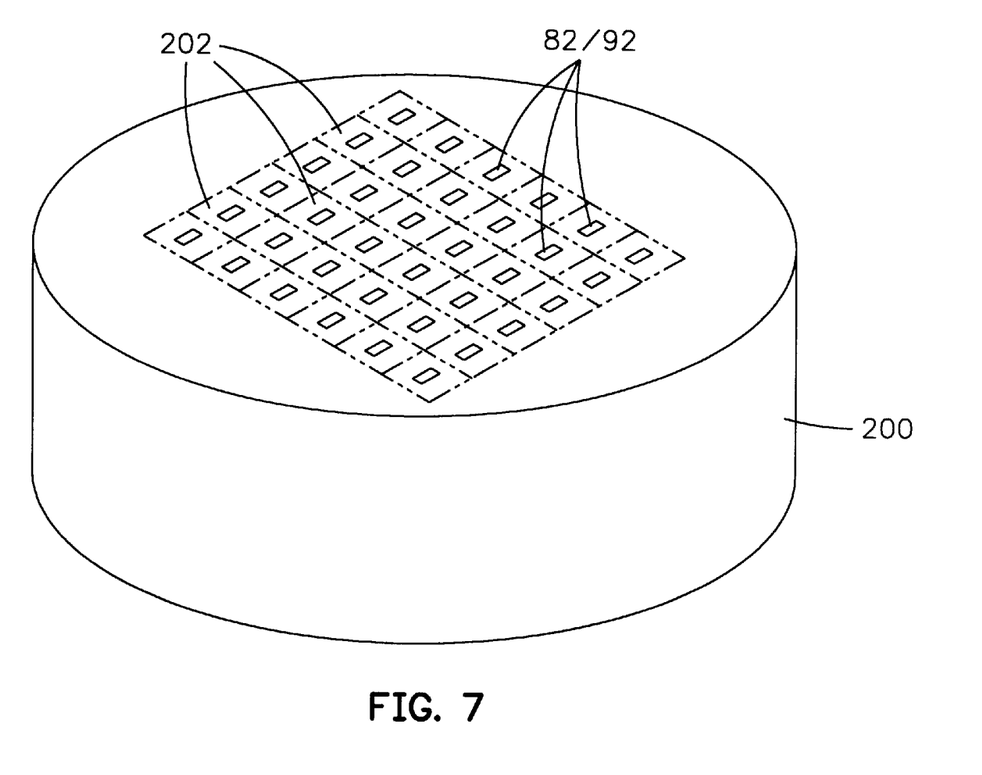
FIG. 7 is an isometric illustration of a wafer substrate with rows and columns of slider sites shown in phantom where a magnetic head assembly is to be constructed within each slider site.

FIG. 7 illustrates a wafer substrate 200 which has rows and columns of slider sites 202 where magnetic head assemblies are to be fabricated by thin film plating and deposition techniques. Magnetic head assemblies have been partially completed in FIG. 7 by the construction of the multiple second shield/first pole piece layers 82/92. After magnetic head assemblies are formed in the slider sites 202, the wafer substrate 200 is diced into rows of slider sites after which each row is lapped to form an air bearing surface for each magnetic head assembly. The air bearing surface is along the depth dimension of the wafer substrate 200 and after lapping may be etched in order to provide the rails 56, 58 and 60 as shown in FIG. 3. The row of slider sites is then diced into individual sliders wherein each slider supports a magnetic head assembly 40 as illustrated in FIG. 3. It should be noted from FIG. 7 that the phantom lines crisscross one another to define the perimeters of the slider sites. It can be seen that each slider site shares a portion of its perimeter with a perimeter of slider sites immediately adjacent thereto.

Figure 8:
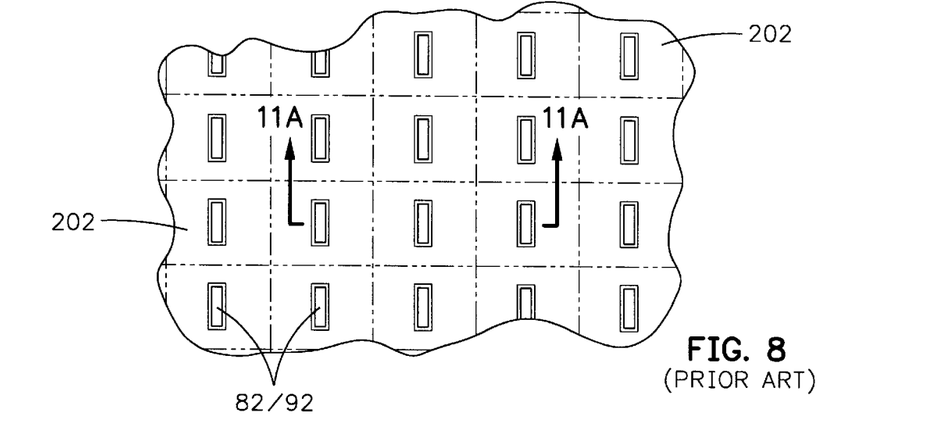
FIG. 8 is a plan view of the top surface of the rows and columns of slider sites on the wafer substrate in FIG. 7 after the second shield/first pole piece layer has been photopatterned within each slider site.
Figure 11A:
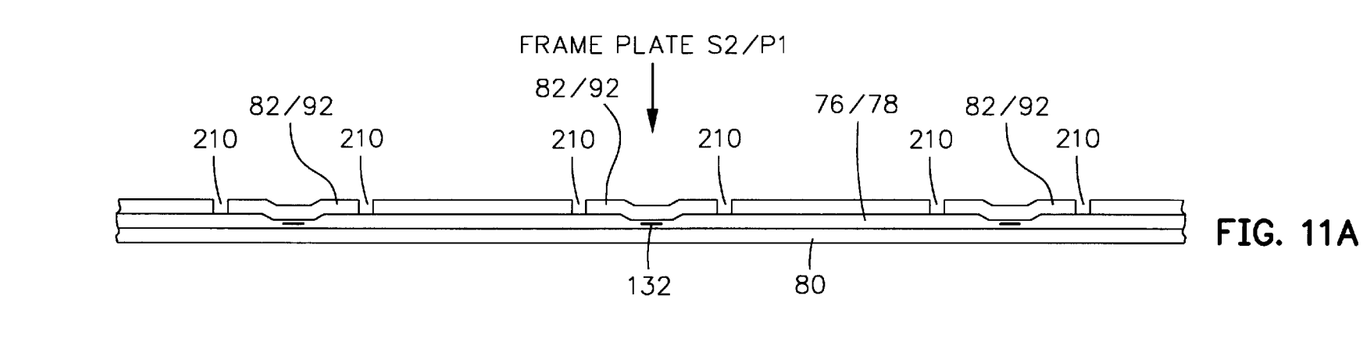
FIG. 11A is a view taken along plane 11A—11A of FIG. 8.
Figure 11B:
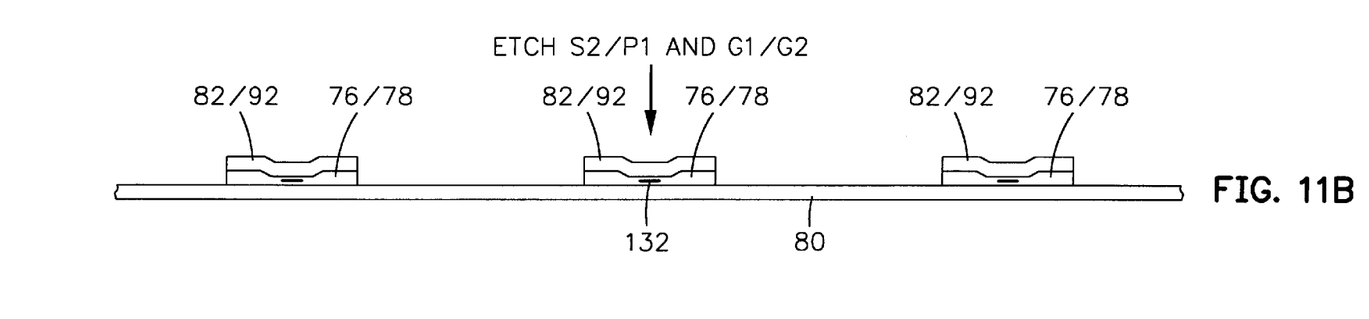
FIG. 11B is the same as FIG. 11A except second shield/first pole piece material and second and first read gap material have been removed in field regions about each second shield/first pole piece layer.
Figure 11C:
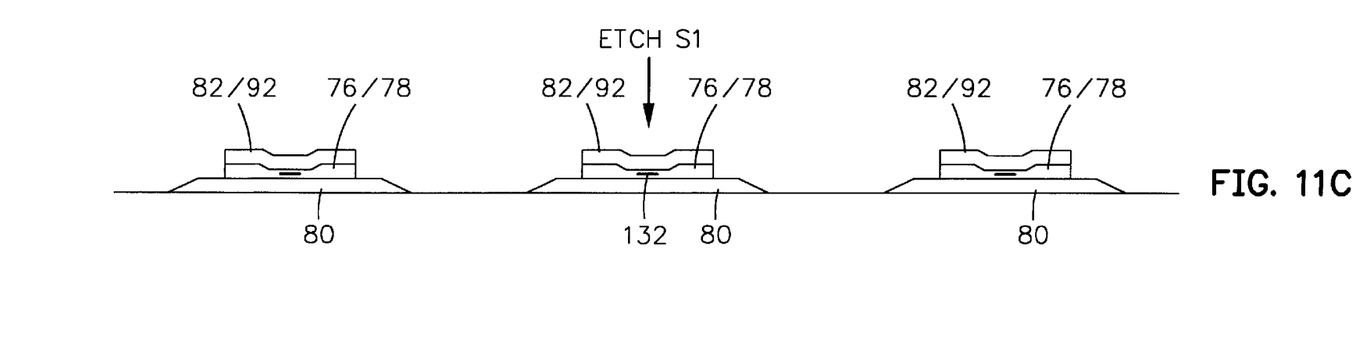
FIG. 11C is the same as FIG. 11B except portions of the first shield layer have been removed in the field regions about each partially completed magnetic head assembly.

FIG. 8 illustrates an enlarged portion of the rows and columns of slider sites 202 of FIG. 7. Within each slider site is a respective second shield/first pole piece layer 82/92 which has been formed by photolithography techniques which will be discussed in more detail hereinafter. In the embodiment shown in FIG. 8, no steps have been taken to planarize the second shield/first pole piece layers 82/92 which results in write gap curvature as shown in FIG. 5. The method of making the embodiment shown in FIG. 8 is shown in FIGS. 11A–11C. In FIG. 11A the second shield/first pole piece layer 82/92 is frame plated which results in a discontinuity at the perimeter 210 of each second shield/first pole piece layer from the remainder of the second shield/first pole piece plated layer located in the field laterally beyond the second shield/first pole piece layers. It should be noted from FIG. 8 that this field is continuous without any further separation. In FIG. 11B second shield/first pole piece material and second and first read gap material are removed in the field by any suitable means such as etching. In FIG. 11C first shield material is removed in the field so as to shape the first shield layer of each magnetic head assembly. After completion of the head the write gap 102 will have write gap curvature as shown in FIG. 5.

Figures 12A, 12B:
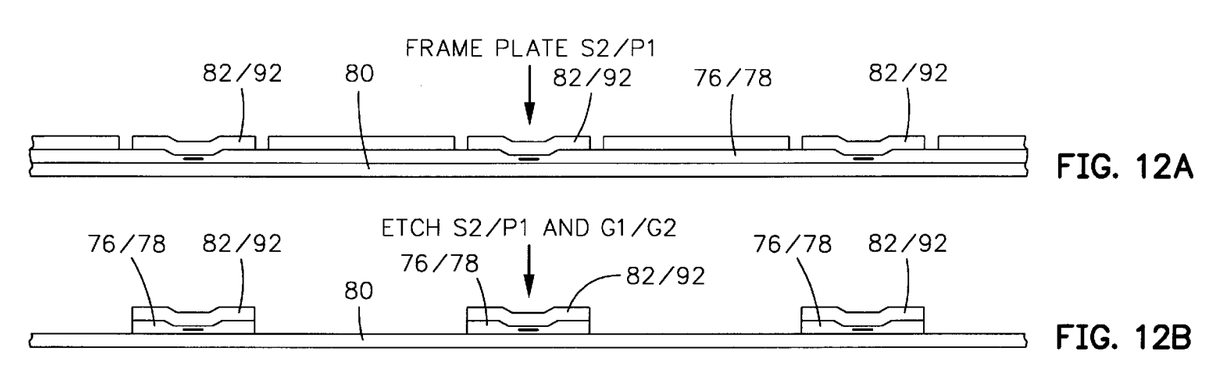
FIG. 12A is the same as FIG. 11A.
FIG. 12B is the same as FIG. 11B.
Figure 12C:
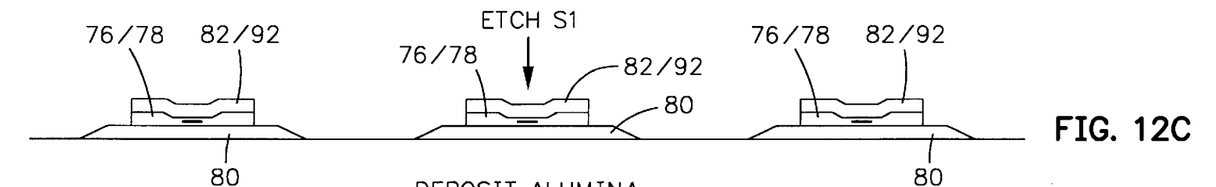
FIG. 12C is the same as FIG. 11C.
Figure 12D:
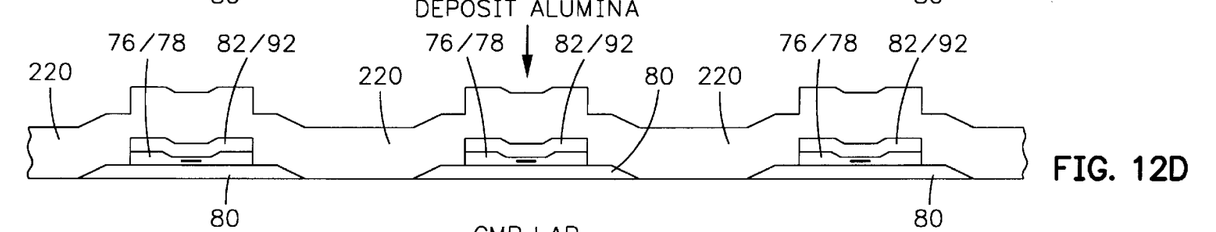
FIG. 12D is the same as FIG. 12C except an alumina layer has been sputter deposited on the wafer substrate.
Figure 12E:
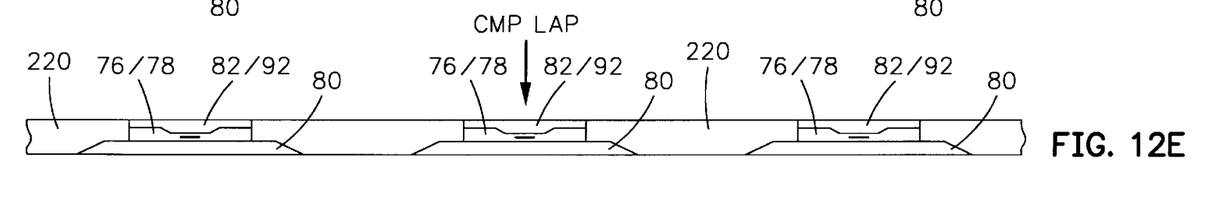
FIG. 12E is the same as FIG. 12D except the top surface of the alumina layer and the top surfaces of the second shield/first pole piece layers have been lapped by CMP to a common flat surface co-extensive with dipped portions of the second shield/first pole piece layers.

A first scheme investigated by us for correcting write gap curvature is illustrated in FIGS. 12A–12E. The first three steps, shown in FIGS. 12A–12C, are the same as the steps shown in FIGS. 11A–11C. As shown in FIG. 12D a layer of alumina 220 is then sputter deposited on the wafer substrate of a thickness which is greater than the total thickness of the first shield layer 80, the first and second read gap layers 76 and 88 and the second shield/first pole piece layer 82/92. In FIG. 12E lapping by chemical mechanical polishing (CMP) is implemented to planarize the alumina layer 220 and the top surface of the second shield/first pole piece layer 82/92 to a common plane. It should be noted from FIG. 12E that the high profile portions of the second shield/first pole piece layer 82/92 within each slider site has been removed down to the top portion of the aforementioned dip of each of the second shield/first pole piece layers.

Unfortunately, the alumina layer portions in the field regions in FIG. 12E contribute to obscuring alignment marks on the wafer substrate which are necessary to the operation of the photolithography tool employed for frame plating the write coil 84 and the second pole piece layer 94 in FIG. 4. An electrically conductive seed layer (not shown) must be deposited on the alumina layer in FIG. 12E before the photoresist frame is constructed for frame plating the write coil layer. The seed layer on top of the alumina layer obscures the alignment marks on the wafer substrate so that the photolithography tool cannot be sequenced progressively along the wafer substrate to light expose the photoresist layer. Consequently other steps, which decrease manufacturing yield, must be employed in order to utilize the photolithography tool.

Chemical mechanical polishing (CMP) is implemented by a CMP tool (not shown). The CMP tool has a turntable upon which a slurry is dispensed. A pad is located on the turntable upon which a slurry is dispensed. The wafer substrate having the rows and columns of slider sites is mounted on a rotatable holder which is capable of engaging the wafer substrate with the turntable. While both the turntable and the holder are rotating, the slurry is dispensed which causes chemical mechanical polishing of the wafer substrate surface where the rows and columns of slider sites are located. The slurry contains an abrasive, such as colloidal silica, and one or more chemicals such as potassium hydroxide (KOH). While the colloidal silica grinds away certain portions of the wafer substrate the one or more chemicals reacts with portions of the wafer substrate for removal purposes. The abrasion and the chemical reaction may work collectively on a particular material on the wafer substrate or the colloidal silica may selectively remove one material from the wafer substrate while the chemical reacts with another material on the wafer substrate for its removal.

Figure 13A:
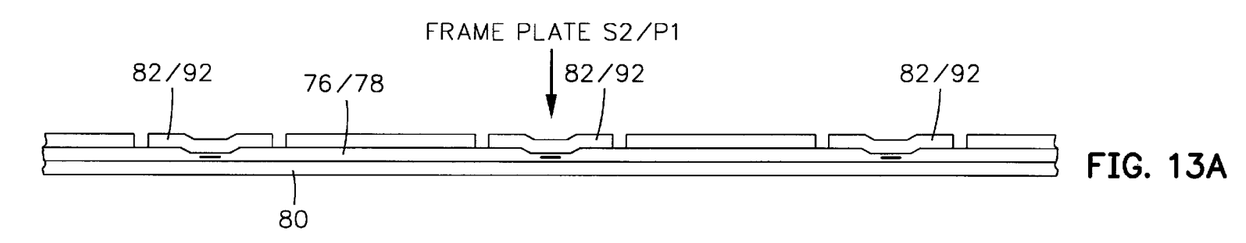
FIG. 13A is the same as FIG. 11A.
Figure 13B:
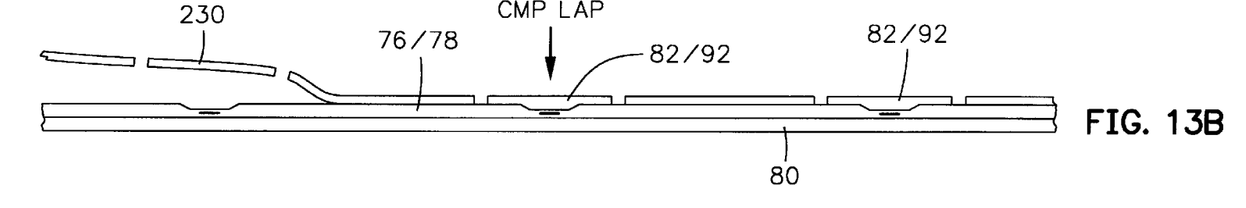
FIG. 13B is the same as FIG. 13A except the wafer substrate has been lapped by CMP which causes a delamination of portions of the second shield/first pole piece material layer from an underlying second read gap layer.
Figure 13C:
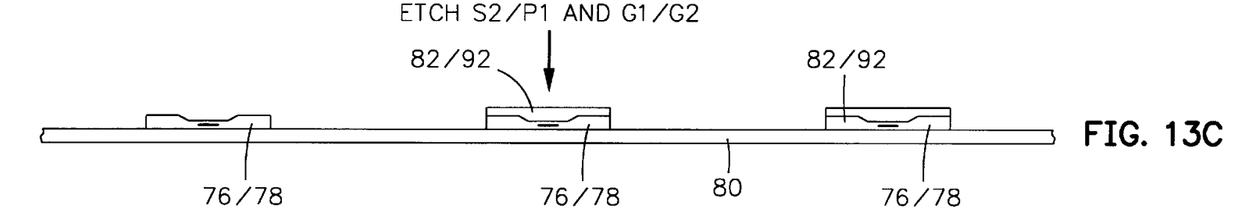
FIG. 13C is the same as FIG. 13B except the second shield/first pole piece material layer and the second and first read gap layers in field regions about the partially completed magnetic head assemblies have been removed.
Figure 13D:
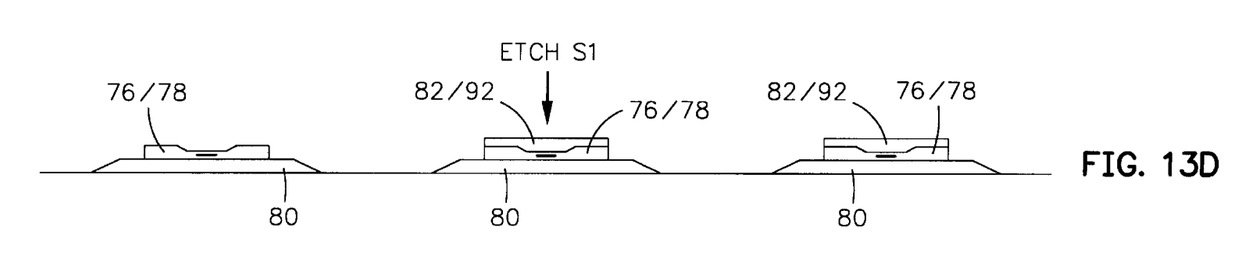
FIG. 13D is the same as FIG. 13C except first shield layer material portion in the field regions about partially completed magnetic head assemblies has been removed.

The second scheme illustrated in FIGS. 13A–13E will result in a magnetic head 40 as shown in FIG. 6 wherein the write gap layer 102 does not have write gap curvature. The second scheme is illustrated in FIGS. 9 and FIGS. 13A–13D. The first steps shown in FIG. 13A are the same as the first steps shown in FIG. 11A. Next, the wafer substrate is lapped by chemical mechanical polishing (CMP) in order to planarize the second shield/first pole piece layer 82/92. Unfortunately, we have found that the second shield/first pole piece material layer 82/92 delaminates from the second read gap layer during the chemical mechanical polishing as shown by the left side of FIG. 13B. We have reasoned that this is due to the high stress of the plated second shield/first pole piece material layer surrounding the second shield/first pole piece layers 82/92 within the slider sites. As can be seen from FIG. 9 the rows and columns of second shield/first pole piece layers appear as islands within a sea of second shield/first pole piece material in a field region therearound. There is no discontinuity in the second shield/first pole piece material layer except for the second shield/first pole piece layers 82/92 which have been photopatterned to separate them from the second shield/first pole piece material therearound. Unfortunately the chemical mechanical polishing (CMP) causes the second shield/first pole piece material layer to delaminate from the second read gap layer such as at 230 in FIGS. 9 and 13B. The delamination may either be characterized by a peeling up of the second shield/first pole piece layer at a corner or may delaminate from the second read gap layer in the form of a bubble. We reasoned that this delamination is due to internal stress within the second shield/first pole piece material surrounding the second shield/first pole piece layers 82/92 of the partially completed magnetic heads. Materials used for the second shield/first pole piece included alloys of NiFe (i.e. $Ni_{80}Fe_{20}$ or $Ni_{45}Fe_{55}$), alloys of NiFeCo, alloys of NiFeCu or alloys of NiFeCuCo. We also reasoned that if the stress within the second shield/first pole piece material layer could be reduced that the second shield/first pole piece material layer could withstand the chemical mechanical polishing (CMP). It should be understood that when the second shield/first pole piece material layer delaminates from the second read gap layer 78 that it will be brought into the slurry of the CMP tool, thereby degrading the performance of subsequent chemical mechanical polishing (CMP). Further, a portion of the second shield/first pole piece layers within the slider sites will be damaged resulting in a lower manufacturing yield. This is demonstrated in FIG. 13C where the left partially complete magnetic head, located to the left, is absent the second shield/first pole piece layer after the second shield/first pole piece layer material and the second and first read gap layers are removed in the field by etching. FIG. 13D illustrates the removal of the first shield material layer in the field so as to define the first shield layer 80 of each magnetic head assembly.

The Invention

Figure 9:
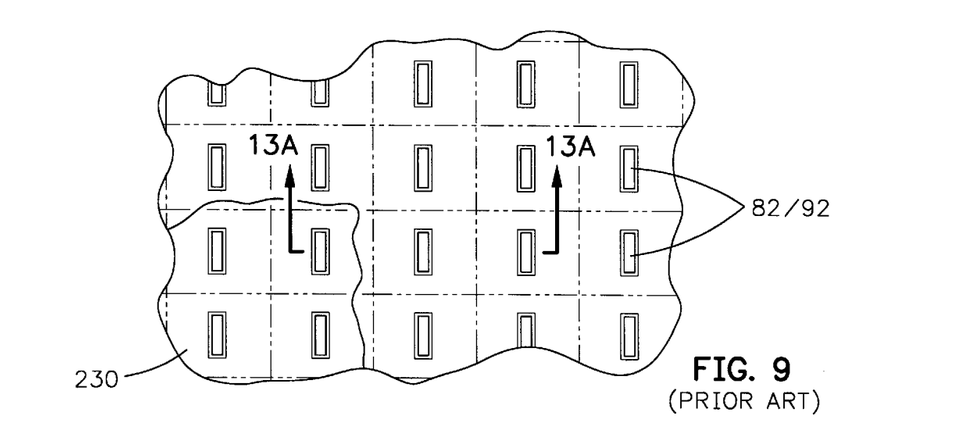
FIG. 9 is the same as FIG. 8 except the wafer substrate has been lapped by CMP causing delamination of a portion of the second shield/first pole piece layer from the wafer substrate.
Figure 10:
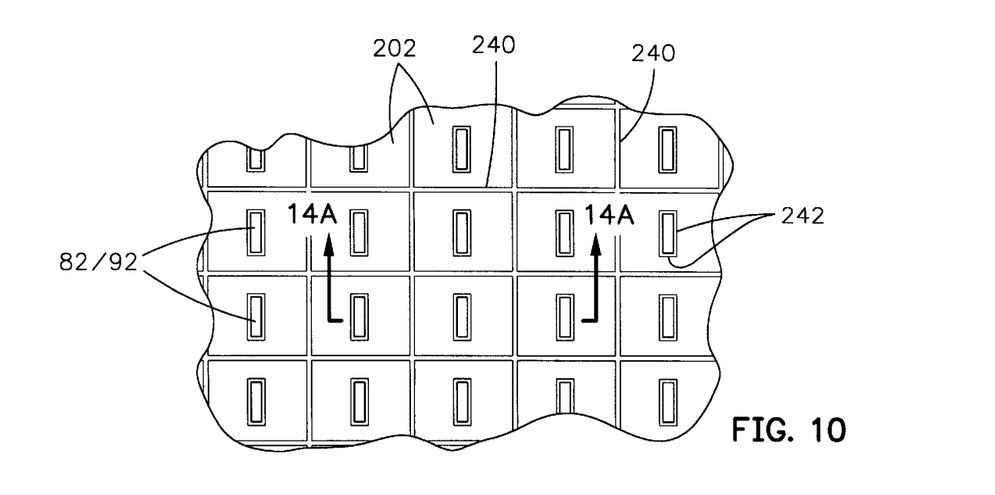
FIG. 10 is a plan view of a portion of the wafer substrate illustrating the present invention with a separation of the second shield/first pole piece material layer at each second shield/first pole piece layer and at the perimeter of each slider site.
Figure 14A:
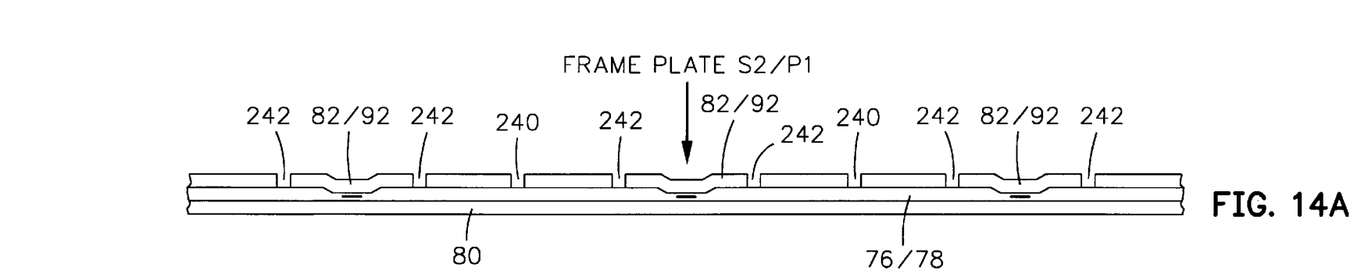
FIG. 14A illustrates the present invention wherein not only are the perimeters of the second shield/first pole piece layers within each slider site discontinued from the surrounding second shield/first pole piece material layer but also the perimeters of each slider site are discontinued so that the full film second shield/first pole piece layer has increased discontinuities before lapping.
Figure 14B:
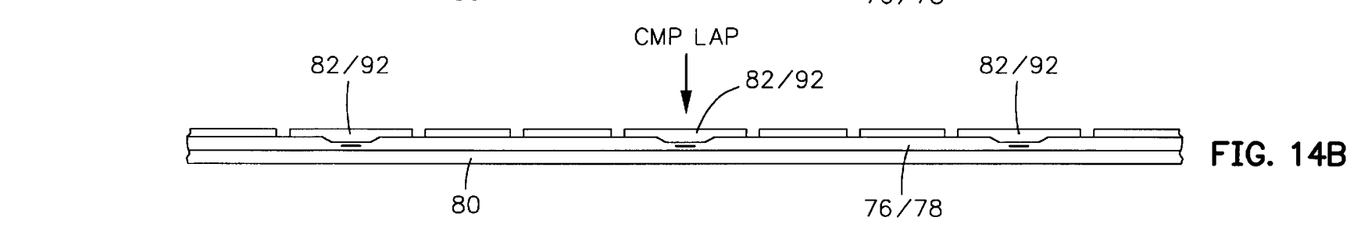
FIG. 14B is the same as FIG. 14A except the wafer substrate has been lapped by CMP until the second shield/first pole piece layers are flat.
Figure 14C:
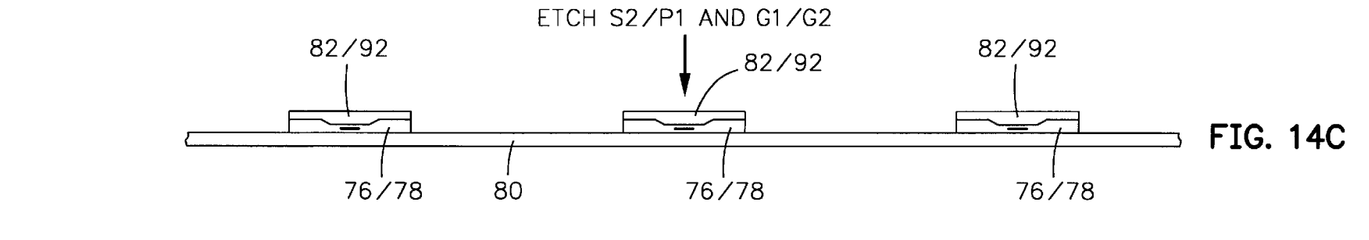
FIG. 14C is the same as FIG. 14B except second shield/first pole piece material layer portions and second read gap and first read gap material layer portions in field regions about each partially completed magnetic head assembly have been removed.

In the present invention the large expanse of the second shield/first pole piece material layer in the field about the second shield/first pole piece layer 82/92 is separated into multiple segments wherein each segment preferably is located at a respective slider site 202 and is implemented by a separation at 240 around the entire outside perimeter of each slider site. Accordingly, in the rows and columns of slider sites the interior slider sites share a common perimeter with four other slider sites, slider sites at the edges of the rows and columns of slider sites share a perimeter with three slider sites while the slider sites at the corners of the rows and columns slider sites share a common perimeter with two slider sites. Rather than a sea of second shield/first pole piece material layer in the field about the second shield/first pole piece layers 82/92 of the magnetic head assemblies, as shown in FIG. 9, the second shield/first pole piece material layer in the field is now segmented into a grid, as shown in FIGS. 10 and 14A. Accordingly, this grid pattern adds to the separation of the second shield/first pole piece material layer over and above the separations of the second shield/first pole piece material layer at the perimeters 210 of the second shield/first pole piece layers 82/92. This is shown in cross-section in FIG. 14A. We have found that when the structure shown in FIG. 14A is lapped by chemical mechanical polishing (CMP), as shown in FIG. 14B, that portions of the second shield/first pole piece material layer do not delaminate from the second read gap layer 78. This is because the additional segmentation of the second shield/first pole piece material layer in the field has reduced the stress so that the stress caused by the lapping is not sufficient for causing delamination. The steps shown in FIG. 14C and 14D are the same as the steps shown in FIG. 13C and 13D in that the second shield/first pole piece layer material and second and first read gap material in the field are removed followed by removal of first shield material layer in the field to define the first shield layers 80 of each magnetic head.

Figure 15A:
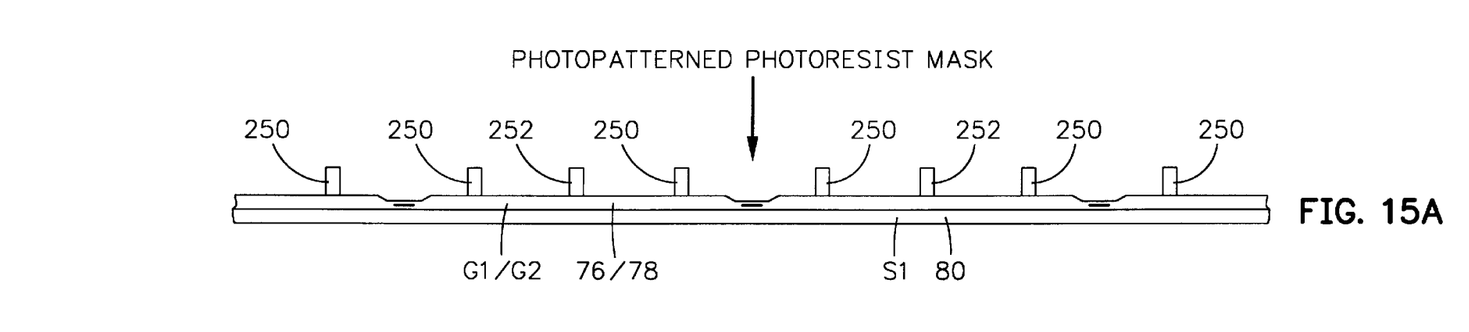
FIG. 15A illustrates the formation of a photoresist mask for plating the second shield/first pole piece layer of FIG. 14A with increased discontinuities.
Figure 15B:
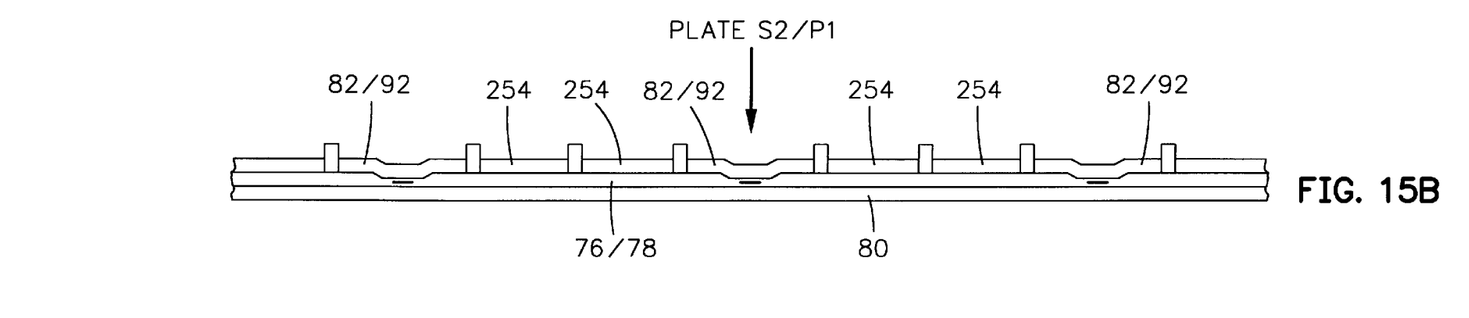
FIG. 15B is the same as FIG. 15A except the second shield/first pole piece material layer has been plated.
Figure 15C:
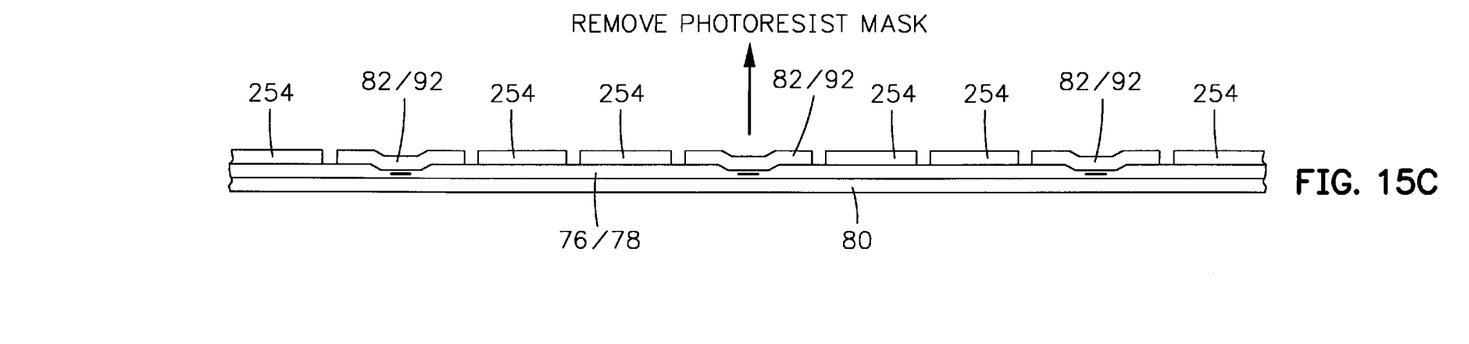
FIG. 15C is the same as FIG. 15B except the photoresist mask has been removed leaving discontinuities for not only the second shield/first pole piece layers but also the slider sites.

FIGS. 15A–15C illustrate photopatterning steps to implement segmenting of the second shield/first pole piece material layer in the field. After spinning a layer of photoresist on the wafer substrate the photoresist layer is light exposed by the photolithography tool in regions which are to be removed assuming that the photoresist is a positive photoresist. The light exposed photoresist is then developed which removes the light exposed portions leaving perimeter portions of the second shield/first pole piece layer sites covered by photoresist portions 250 and perimeter portions of each slider site covered by photoresist portions 252 as shown in FIG. 15A. The second shield/first pole piece material layer is then frame plated resulting in a second shield/first pole piece layer 82/92 for each magnetic head assembly and segmented portions 254 of the second shield/first pole piece material layer in the field. After dissolving the photoresist portions 250 and 252 the wafer substrate appears in cross-section as shown in FIG. 15C which is the same as FIG. 14A.

Figure 14D:
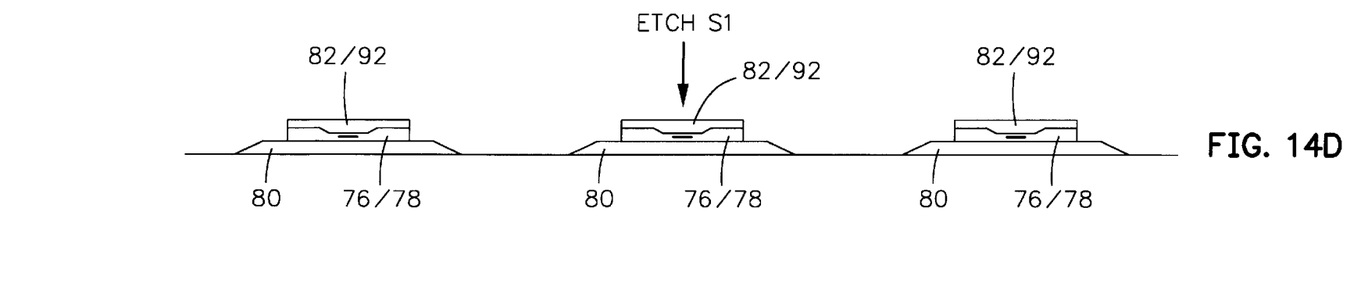
FIG. 14D is the same as FIG. 14C except first shield material layer portions in the field region about each partially completed magnetic head assembly have been removed.
Figure 16:
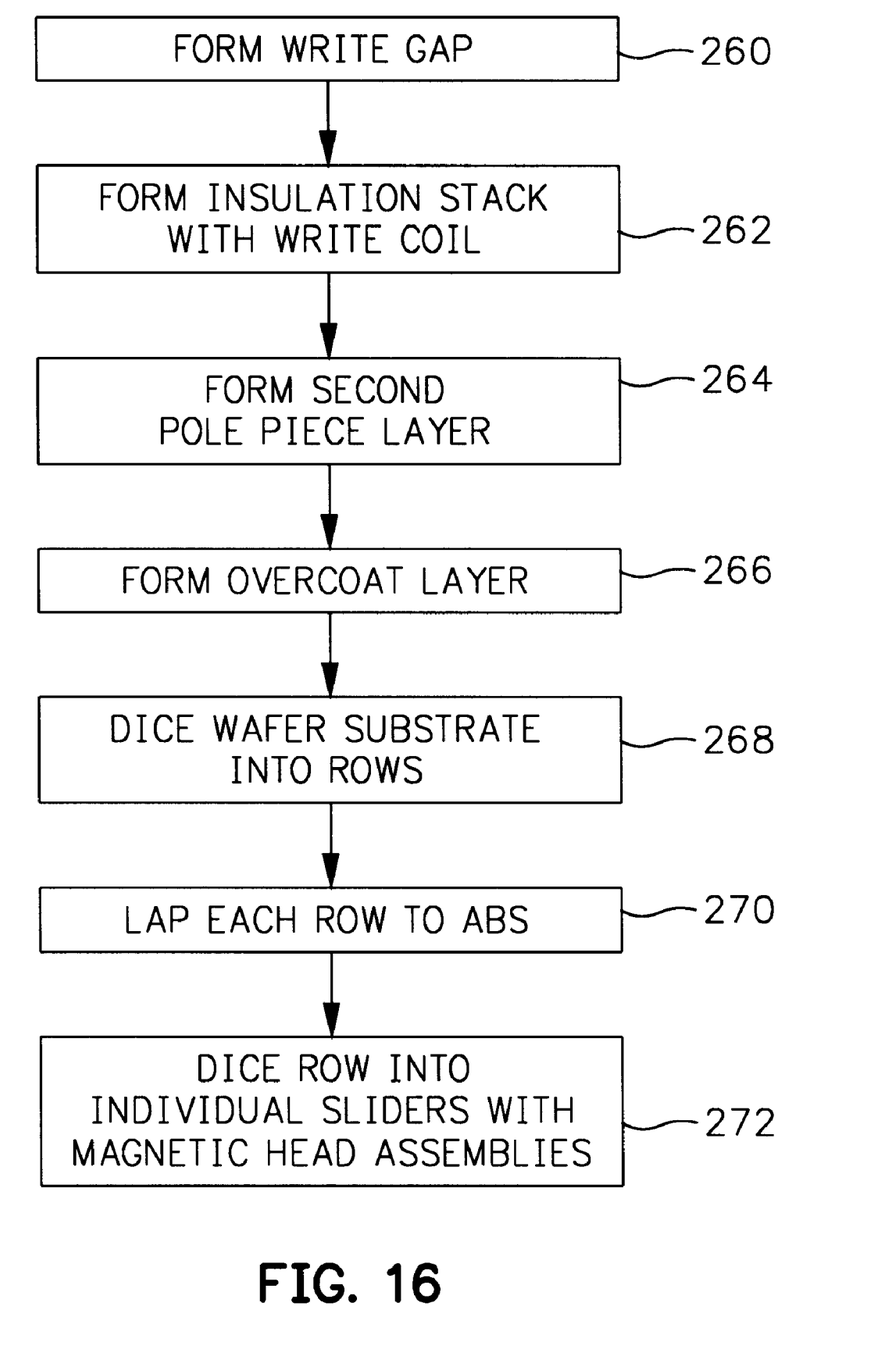
FIG. 16 is a block diagram of steps in making magnetic head assemblies.

After the steps shown in FIG. 14D, subsequent steps in forming the magnetic head assemblies are shown in FIG. 16. As shown in block 260 the write gap layer may be formed as shown at 102 in FIG. 4. Next, as shown in block 262, an insulation stack may be formed as shown by the insulation layers 86, 88, 90 and the write coil layer 84 in FIG. 4. It should be understood that the steps shown in 260 and 262 may be reversed if desired. Next, as shown in block 264, a second pole piece layer is formed as shown at 94 in FIG. 4. In block 266, an overcoat layer is formed which is shown at 42 in FIG. 4. This is followed, as shown in block 268, by dicing the wafer substrate 200 in FIG. 7 into rows of sliders. As shown in block 270 each row is then lapped to form an air bearing surface (ABS) for the slider substrate and the magnetic head assemblies thereon. As shown in block 272 the rows are then diced into individual sliders with each slider supporting a respective magnetic head assembly.

It should be understood that the description has been for a merged magnetic head as shown in FIG. 4 wherein the second shield/first pole piece layer 82/92 is a common layer. In a piggyback head a separate insulation layer is on top of the second shield layer followed by a separate layer for the first pole piece layer of the write head. The invention is also applicable to construction of a write head in a piggyback head since, by replication, the write gap layer 102 in FIG. 5 will still have some write gap curvature, even with a separate first pole piece layer. Accordingly, wherever the term second shield/first pole piece layer has been employed this is to be understood to refer to simply first pole piece layer.

Clearly, other embodiments and modifications of this invention will occur readily to those of ordinary skill in the art in view of these teachings. For instance, the spin valve sensor may be employed for purposes other than a magnetic disk drive, such as a tape drive, search and surveillance devices and laboratory equipment. Therefore, this invention is to be limited only by following claims, which include all such embodiments and modifications when viewed in conjunction with the above specification and accompanying drawings.

We claim:

1. A method of making rows and columns of sliders on a wafer substrate wherein each slider has a respective magnetic head component within a perimeter of the slider comprising the steps of:

forming a mask on the wafer substrate that masks a perimeter portion of each of a plurality of slider sites of said sliders and a perimeter portion of a magnetic head component site of said magnetic head component within a respective one of each of said plurality of slider sites;

plating a ferromagnetic thin film layer on the wafer substrate at the magnetic head component sites to form magnetic head component portions of the ferromagnetic thin film layer and to form a field portion of the ferromagnetic thin film layer about each magnetic head component site that is located between a mask perimeter portion about the magnetic head component site and a mask perimeter portion that is about a respective slider site;

removing the mask at said perimeter portions leaving discrete sliders wherein each slider has a respective field portion that is disconnected and separate from field portions of adjacent sliders and a discrete magnetic head component portion within each respective field portion that is disconnected and separate from the respective field portion; and simultaneously lapping the field portions and the magnetic head component portions for planarizing the field and magnetic head component portions.

2. A method as claimed in claim 1 wherein said lapping is chemical mechanical polishing.

3. A method as claimed in claim 2 wherein the mask is patterned photoresist.

4. A method as claimed in claim 3 including:

removing all of said field portions.

5. A method as claimed in claim 3 wherein each magnetic head component portion is a pole piece.

6. A method as claimed in claim 5 including:

removing all of said field portions.

7. A method as claimed in claim 6 wherein the pole piece is a first pole piece.

8. A method of making a plurality of magnetic head assemblies wherein each magnetic head assembly includes a read head and a write head comprising:

provinding a wafer substrate that has rows and columns of slider sites;

forming a ferromagnetic first shield layer on the substrate within each of the slider sites;

forming a nonmagnetic nonconductive first read gap material layer on the slider sites;

forming a sensor and first and second lead layers connected to the sensor on the first read gap material layer within each slider site;

forming a nonmagnetic nonconductive second read gap material layer on the slider sites so that each second read gap material layer portion on a slider site has a first profile above a first nominal plane of the second read gap material portion due to thicknesses of the sensor and the first and second lead layers within a respective slider site;

frame plating a ferromagnetic second shield material layer on the second read gap material layer with a second shield material layer portion located within each slider site so that each slider site has a separation at a first perimeter portion from other slider sites and has a second perimeter portion within the first perimeter that defines a second shield layer wherein the second shield layer is separated along said second perimeter portion from a field portion of the second shield material layer portion within the respective slider site;

the second shield layer within each slider site having a second profile above a second nominal plane of the second shield layer wherein the second profile is substantially a replication of said first profile; and simultaneously lapping the second shield material layer portions in the slider sites until said second profile is planar and is located at or below said second nominal plane.

9. A method as claimed in claim 8 wherein the second shield material layer is selected from the group comprising nickel iron (NiFe) alloys, nickel iron cobalt (NiFeCo) alloys, nickel iron copper (NiFeCu) alloys and nickel iron cobalt copper (NiFeCoCu) alloys and the second read gap material layer is aluminum oxide ($Al_2O_3$).

10. A method as claimed in claim 8 wherein the frame plating of the ferromagnetic second shield material layer includes:

forming a mask on the second read gap material layer that masks the first perimeter portion of each slider site as well as the second perimeter portion within the first perimeter;

plating said ferromagnetic second shield material layer; and removing the mask.

11. A method as claimed in claim 8 wherein said lapping is chemical mechanical polishing.

12. A method as claimed in claim 11 wherein the second shield material layer is selected from the group comprising nickel iron (NiFe) alloys, nickel iron cobalt (NiFeCo) alloys, nickel iron copper (NiFeCu) alloys and nickel iron cobalt copper (NiFeCoCu) alloys and the second read gap material layer is aluminum oxide ($Al_2O_3$).

13. A method as claimed in claim 12 wherein the frame plating of the ferromagnetic second shield material layer includes:

forming a mask on the second read gap material layer that masks the first perimeter portion of each slider site as well as the second perimeter portion within the first perimeter;

plating said ferromagnetic second shield material layer; and removing the mask.

14. A method as claimed in claim 8 wherein the first perimeter portion of each magnetic head assembly site is shared with first perimeter portions of other magnetic head assembly sites.

15. A method as claimed in claim 14 including:

removing all field portions of the second shield material layer.

16. A method as claimed in claim 15 including removing all of the first and second read gap material layers except for first and second read gap layer portions between the first shield layer and the second shield layer within each slider site.

17. A method as claimed in claim 16 wherein the second shield layer within each slider site serves as a second shield layer for the read head and a first pole piece layer for the write head and wherein each first pole piece layer has a yoke region between a pole tip region and a back gap region, the method comprising:

within each slider site forming an insulation stack with at least one coil layer on the first pole piece layer in said yoke region;

within each slider site forming a write gap layer on the first pole piece layer in the pole tip region; and within each slider site forming a second pole piece layer on the write gap layer and the insulation stack and connecting the second pole piece layer to the first pole piece layer at the back gap region.

18. A method as claimed in claim 17 said lapping is chemical mechanical polishing.

19. A method as claimed in claim 18 wherein the second shield material layer is selected from the group comprising nickel iron (NiFe) alloys, nickel iron cobalt (NiFeCo) alloys, nickel iron copper (NiFeCu) alloys and nickel iron cobalt copper (NiFeCoCu) alloys and the second read gap material layer is aluminum oxide ($Al_2O_3$).

20. A method as claimed in claim 19 wherein the frame plating of the ferromagnetic second shield material layer includes:

forming a mask on the second read gap material layer that masks the first perimeter portion of each slider site as well as the second perimeter portion within the first perimeter portion;

plating said ferromagnetic second shield material layer; and removing the mask.

21. A method as claimed in claim 20 including:

cutting the wafer substrate into individual rows of magnetic head sliders;

lapping a row of sliders to form an air bearing surface for each slider; and cutting each row of sliders into individual sliders.

* * * * *